United States Patent [19]

Kaplan

[11] Patent Number: 5,381,128
[45] Date of Patent: Jan. 10, 1995

[54] VEHICLE SECURITY SYSTEM WITH EMERGENCY OVERRIDE

[76] Inventor: Neil B. Kaplan, 2239 Quail Ridge S., Palm Beach Gardens, Fla. 33418

[21] Appl. No.: 100,731

[22] Filed: Aug. 2, 1993

Related U.S. Application Data

[63] Continuation-in-part of Ser. No. 943,058, Sep. 10, 1992, abandoned.

[51] Int. Cl.⁶ ............................................. B60R 25/10
[52] U.S. Cl. ................................. 340/426; 180/287; 307/10.2; 307/10.6
[58] Field of Search ............. 340/426, 428, 430; 307/10.2, 10.3, 10.4, 10.6; 180/287

[56] References Cited

U.S. PATENT DOCUMENTS

| | | | |
|---|---|---|---|
| 4,150,731 | 4/1979 | Tannenbaum | 307/10.4 |
| 4,645,939 | 2/1987 | Robinson | 307/10.4 |
| 5,049,867 | 9/1991 | Stouffer | 340/426 |
| 5,079,435 | 1/1992 | Tanaka | 307/10.2 |
| 5,086,288 | 2/1992 | Stramer | 340/426 |
| 5,103,932 | 4/1992 | Hansen et al. | 340/426 |
| 5,216,406 | 6/1993 | Bechtle | 340/426 |
| 5,224,567 | 7/1993 | Tomlinson | 307/10.3 |
| 5,247,279 | 9/1993 | Sato | 340/426 |

Primary Examiner—Brent Swarthout
Attorney, Agent, or Firm—Cesari and McKenna

[57] ABSTRACT

A security system for a vehicle of the type having an engine with a starting switch movable between an OFF position and an engine START position includes an alarm module for disabling the engine and/or sounding an alarm in the event of an intrusion into the vehicle. Activating means activate the alarm module either automatically when the vehicle operator leaves the vehicle or in response to a signal from a transmitter in the operator's possession. The alarm module can be disarmed or deactivated without the transmitter by turning the engine starting switch from its OFF to its START position a selected number of times. A time delay may also be incorporated into the system so the disarm code may be a selected number of start attempts in combination with a selected time delay(s) before, during or after those attempts have been made.

7 Claims, 4 Drawing Sheets

VEHICLE SECURITY SYSTEM WITH EMERGENCY OVERRIDE

RELATED APPLICATION

This application is a continuation-in-part of Ser. No. 07/943,058, filed Sep. 10, 1992, now abandoned.

FIELD OF THE INVENTION

This invention relates to a vehicle security system for preventing unauthorized use of a vehicle. It relates more particularly to a passive system that becomes armed and operative automatically when a user leaves the vehicle.

BACKGROUND OF THE INVENTION

There are many types of vehicle security systems or vehicle anti-theft systems in use today for preventing unauthorized entry into, and operation of, a vehicle. A system such as this usually includes some means for disabling the vehicle when the system is armed or rendered operative and some kind of an alarm which sounds when attempts are made to enter the vehicle or to lift the vehicle's hood or to tamper with the security system. In systems designed for incorporation into vehicles with power door locks, the system may also include a module for automatically actuating the door locks when the vehicle is armed or rendered operative.

Some vehicle security systems are so-called active systems in the sense that the system is armed and disarmed by actuation of a key switch outside the vehicle. Some contemporary active systems use coded radio frequency (RF) transmitters and receivers to arm and disarm the system. An example of this type of arrangement is disclosed in U.S. Pat. No. 3,703,714.

Other systems are denominated passive systems because they become armed or set automatically after the operator leaves the vehicle. For example, some passive systems become armed a selected time after the ignition has been turned off. Usually such systems require the installation of a conductor from the security system to the ignition circuitry to sense whether or not the ignition is turned on. Other systems are set automatically after all of the vehicle doors have been closed. The trouble with these prior passive systems is that they fail to take into consideration whether or not there are any passengers in the vehicle at the time the system is armed. Obviously, if a person or pet happens to be in the car when the system becomes armed, any motion of that person or pet would set off the alarm. Also, if the system includes an automatic door lock feature, the arming of the system may often result in the locking of the doors, making it more difficult for a less competent passenger such as a small child or an aged or infirmed adult to escape from the vehicle in an emergency situation.

Another problem with prior vehicle security systems is that there is no convenient and secure arrangement for overriding the system in the event that the arm/disarm transmitter becomes inoperative or lost. While these hand held transmitters are very convenient, they do have problems, to wit: their batteries wear out, they become wet, they are sometimes subject to external electrical interference, etc.

The common provision for allowing the vehicle operator to override the security system without a transmitter is to provide a "hidden" override or valet switch in the vehicle. It is the universal procedure to require the ignition switch and the override switch to be ON in order to disarm the security system. The accepted theory is that a thief cannot disable the system even if he finds the override switch because he does not have the key to the ignition switch. However, this completely ignores the fact that the thief can easily penetrate the vehicle's steering column and disable the ignition switch. After doing that, he simply feels around under the dash or elsewhere to find the hidden override switch. The switch wiring may also lead him to the alarm control module enabling him to completely disable the security system. Thus, the presence of the hidden override switch actually undoes all the security ostensibly provided by the carefully coded alarm system transmitter. In actuality, then, the value of an override switch depends upon the specific vehicle model and the ability of the installer to adequately hide the switch. Examples of such conventional systems with override or valet switches are disclosed in U.S. Pat. Nos. 5,049,867 and 5,079,538.

SUMMARY OF THE INVENTION

Accordingly, it is an object of the present invention to provide a vehicle security system which will not become armed or set unless the associated vehicle is unoccupied at the time.

Another object of the invention is to provide a system of this type which is relatively easy to install in most vehicles.

Still another object of the invention is to provide a vehicle security system which will not become armed or set when the engine of the associated vehicle is running.

A further object of the invention is to provide such a system which does not require the installation of electrical conductors to the vehicle's ignition system to determine whether or not the vehicle's engine is running.

A further object of the invention is to provide a vehicle security system having one or more of the above advantages, yet which is relatively inexpensive to make and install in most vehicles.

Another object of the invention is to provide a vehicle security system with an improved override arrangement which does not compromise the security of the overall system.

Yet another object of the invention is to provide such an override arrangement which does not require a so-called override or valet switch.

A further object of the invention is to provide an emergency override for a vehicle security system which does not appreciably increase the overall cost of the system.

Other objects will, in part, be obvious, and will, in part appear hereinafter. The invention accordingly comprises the features of construction, combination of elements and arrangement of parts which will be exemplified in the following detailed description, and the scope of the invention will be indicated in the claims.

My invention will be described with reference to a vehicle anti-theft system. However, it should be understood that it may be incorporated into any security system that offers space protection, including home security systems and building security systems generally.

Briefly, my system is a passive system which includes means for sensing whether or not the vehicle or other space being protected by the system is occupied. While many security systems incorporate infra-red, ultrasonic, microwave or other motion detectors to provide space protection after the systems are armed, my security system uses the output of the motion detector to control the arming of the system itself. In other words, my system uses the motion detection means to sense the presence of people or moving things in the associated vehicle or space and to prevent the arming of the system upon the detection of such motion. Preferably, the motion detector used to arm the security system is the same one used to set off the system's alarm when the associated vehicle or other space is invaded. Therefore, the incorporation of the invention into a more or less conventional passive security system does not add appreciably to the overall cost of that system because the motion detection means is already part of the system.

My security system designed for vehicle protection also includes provision for preventing the arming or setting of the system if the engine of the associated vehicle is running. Many present day anti-theft devices already include provision for controlling engine operation. Invariably, however, this provision comes into play only after the anti-theft device is armed to prevent an intruder from starting the engine and stealing the vehicle. My system takes advantage of the fact that when a vehicle's engine is running, the voltage in the line from the vehicle's battery is higher than the standing battery voltage. The system makes a simple voltage comparison to verify that the vehicle's engine has been shut off before the system can become armed. Thus, the detection of whether or not the vehicle's engine is running does not require any special conductors leading from the security system to the vehicle's ignition circuitry as is the case with some prior anti-theft devices incorporating engine kill switches.

Preferably, in my system designed for automotive use, the arming of the system is dependent upon both whether or not the associated vehicle is occupied and whether or not the vehicle's engine is running. However, it will be apparent that definite advantages result from a system which is dependent upon only one of those arming conditions.

Preferably, my system also incorporates an override feature for de-activating the system without using the hand held transmitter, yet without compromising the overall security of the system. This feature takes advantage of the fact that in this system, as in most vehicle security systems, there is a signal pulse produced by or available to the system which is only present when the system is armed and an attempt is made to start the vehicle.

The present system includes circuitry for counting these "start attempt" pulses and comparing that count to a coded amount chosen by the vehicle owner, i.e., the override code. If the counts match, and preferably also, if the operator waits a selected pre-programmed time interval, the system will be disarmed. If the number of pulses, i.e., start attempts, is incorrect or the operator does not wait the correct period of time, the system will not be disarmed and the override code will be re-entered (i.e., re-oriented) into the system's count memory.

Thus, the override circuit allows the operator to start the vehicle in the event that the usual arm/disarm transmitter becomes lost or inoperative. This circuit also allows another authorized person such as a valet to start the vehicle without the transmitter, provided he has been given the access code, i.e., the selected number of start attempts and the waiting interval.

Since the incorporation of the invention into an existing anti-theft or space protection system can be accomplished relatively easily and inexpensively, the invention should find wide application not only in systems designed to prevent auto-theft, but also in space security systems generally such as those used to protect home and office spaces.

BRIEF DESCRIPTION OF THE DRAWINGS

For a fuller understanding of the nature and objects of the invention, reference should be had the following detailed description taken in connection with the accompanying drawings in which.

DETAILED DESCRIPTION OF ILLUSTRATIVE EMBODIMENT

Figure 1:
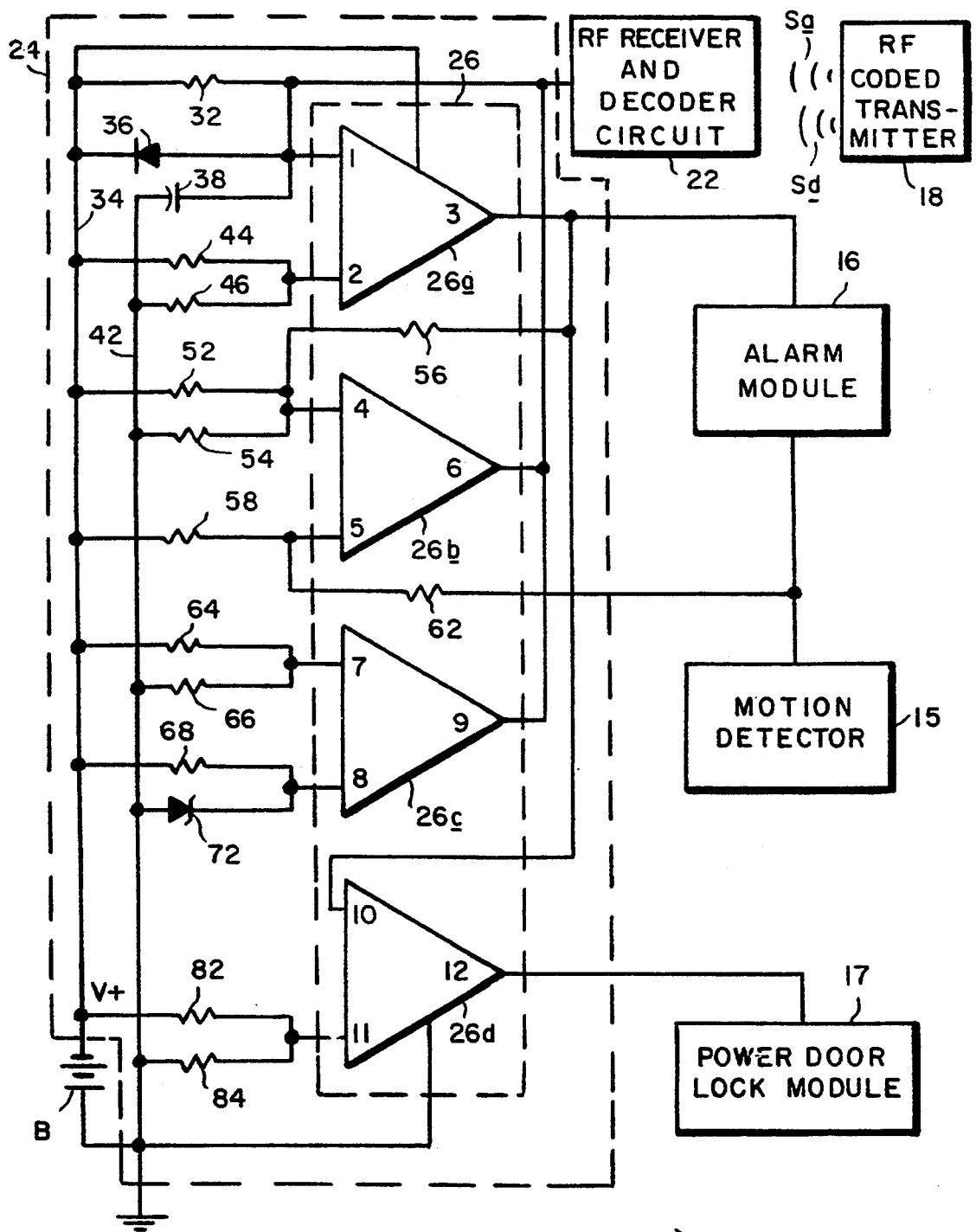
FIG. 1 illustrates diagrammatically and in block form a security system incorporating my invention.

Refer now to FIG. 1 of the drawings which shows a vehicle security system 14 incorporating my invention and designed to be installed in a vehicle (not shown) and to draw its power from the vehicle's battery B. The system includes a motion detector 15 for positioning inside the vehicle passenger space and which, in conventional anti-theft systems, only detects an intrusion into the vehicle. Detector 15 may be an infra-red, ultrasonic, microwave, radio-wave (flash) or other known type of detector able to sense motion within the vehicle space. The illustrated detector 15 produces a low electrical output signal when it detects motion in the vehicle.

The system also includes an alarm module 16 which, when the system is armed, sounds an alarm when an intrusion into the passenger space is detected by detector 15. The alarm module 16 should also be understood to include the other activatable security features normally found in such security systems such as a switch for connection in the vehicle's electrical system i.e., to the coil, that will prevent the vehicle engine from running, a solenoid-actuated dead bolt to prevent the front hood from being opened, etc.

Additionally, if the system is designed for installation in a vehicle with power door locks, it may also incorporate a conventional power door lock module 17 for automatically controlling those door locks.

The system may be controlled remotely by signals from a hand-held RF coded transmitter 18 usually carried by the vehicle's operator. Transmitter 18 is arranged to emit a disarming signal $S_d$. If desired, it may also emit a different signal $S_a$ for arming the system, although preferably the system, like many conventional passive systems, is arranged to arm automatically after the operator leaves the vehicle. The signal(s) is detected and decoded by an RF receiver and decoder circuit 22 which is part of the system installed in the vehicle. In response, circuit 22 delivers a corresponding output signal to an arming circuit 24. In the illustrated system, when the system is armed either automatically as described or in response to a signal $S_a$ from transmitter 18, the circuit 22 output floats; when that circuit 22 receives a signal $S_d$ from transmitter 18, the circuit output becomes low, i.e., drops to essentially ground voltage.

Arming circuit 24 operates to prevent the system from arming if motion detector 15 detects in the vehicle the presence of a moving occupant such as a person or pet. This same circuit also prevents the system from arming if the vehicle's engine is running. On the other hand, once those two conditions are met, (i.e., no moving occupant; engine off), circuit 24 becomes armed and controls module 17 to lock the vehicle's doors. In addition, that circuit enables the alarm module 16 so that an alarm will sound if motion detector 15 subsequently detects that someone or something has intruded into the vehicle.

Once circuit 24 has been armed, it may be disarmed by actuating transmitter 18 so that the transmitter emits a disarming signal $S_d$ to circuit 22.

The arming circuit 24 comprises a multi-section voltage comparator 26 which may be a standard integrated circuit such as a type MC 3302P circuit which is a widely used automotive voltage comparator chip. It incorporates four comparator sections 26a, 26b, 26c and 26d each of which has two input terminals and one output terminal identified by the terminal numbers shown in FIG. 1 When the upper input terminal (1,4,7,10) of a particular comparator has a higher voltage than the lower input terminal (2,5,8,11) of that comparator, then the output terminal (3,6,9,12,) of that comparator goes to ground. On the other hand, for a given comparator, when the voltage at the lower input terminal is higher than that at the upper input terminal, the output terminal floats at line voltage but does not drive the associated line positive.

Terminal 1 of comparator 26a receives the output of the decoder circuit 22. That terminal is also connected via a resistor 32 to a bus 34 leading to the positive side of the vehicle's battery B. There is also a diode 36 connected between terminal 1 and bus 34 in parallel with resistor 32. That terminal 1 is also connected by way of a capacitor 38 to a bus 42 leading to the negative side of battery B which corresponds to the vehicle's electrical ground. The other input terminal 2 of comparator section 26a is connected by resistor 44 to bus 34 and also by way of a second resistor 46 to bus 42. The output from comparator 26a, appearing in terminal 3 thereof, is applied to enable or arm the alarm module 16. In the illustrated system 14, a low signal at terminal 3, i.e., 0 volts, enables or arms module 16. In other words, when the voltage at input terminal 1 exceeds that at input terminal 2, the comparator 26a enables module 16. On the other hand, when the output at terminal 3 is high, alarm module 16 is disabled.

The comparator 26b is the one that actually responds to the output from the motion detector 15 to prevent the system 14 from becoming armed if motion is detected in the vehicle before the system is armed. The upper input terminal 4 of section 26b is connected via a resistor 52 to bus 34 and by way of a second resistor 54 to bus 42. Also, that same terminal receives the output of comparator section 26a via a resistor 56. The lower input terminal 5 of comparator section 26b is connected to bus 34 by way of a resistor 58. That same terminal 5 receives the output of motion detector 15 by way of a resistor 62, the output of detector 12 also being applied to alarm module 14 to trigger the alarm after the system is armed. The output of comparator section 26b at terminal 6 thereof is connected back to the input terminal 1 of section 26a.

The third comparator section 26c is the one that prevents the system from being armed if the vehicle's engine is running. It has an input terminal 7 connected by way of a resistor 64 to bus 34 and via a second resistor 66 to bus 42. The other input terminal 8 of that comparator section is connected by a resistor 68 to bus 34. There is also a Zener diode 72 connected between terminal 8 and bus 42. The output of comparator section 26c at terminal 9 thereof is connected back to terminal 1 of comparator section 26a.

The forth and last section 26d of comparator 26 controls the door lock module 17 and prevents that module from becoming operative so long as motion is detected in the vehicle. Section 26d has its upper input terminal 10 connected to receive the output of comparator section 26a. The other input terminal 11 of that same comparator section is connected by a resistor 82 to bus 34 and by way of a second resistor 84 to bus 42. The output from comparator section 26d at terminal 12 thereof controls the power door lock module 17.

We will now describe the operation of the system. In order for the arming circuit 26 to arm the system, the voltage at the input terminal 1 of comparator section 26a must be high. That voltage goes low to disarm the system when the decoder circuit 22 receives a disarm signal $S_d$ from the transmitter 18. That voltage is also low when the output from the comparator section 26b becomes low after motion detector 15 detects motion in the vehicle before the system is armed. Still further, the voltage at the input terminal 1 of comparator section 26a becomes low when the comparator section 26c produces a low output signal indicating that the associated vehicle's engine is running.

When the voltage at the terminal 1 of comparator section 26a is high, i.e., the system is not disarmed, the voltage across capacitor 38 is maintained at the full voltage of battery B, being charged by the voltage across the resistor 32. The diode 36 is present to discharge capacitor 38 in the event that the battery B is disconnected for maintenance or replacement. When the battery is re-connected, tile system will not re-arm until capacitor 38 charges past the voltage reference at input terminal 2 of capacitor section 26a. Preferably, the voltage at terminal 2 is maintained at about 9V by the voltage divider 44, 46. Thus, the charging of the capacitor 38 creates a time delay giving the vehicle operator time to close the vehicle hood after the battery is installed and to start the vehicle engine, or at least occupy the vehicle. If no one is in the vehicle and the operator simply leaves the vehicle or quickly retrieves a package from the vehicle, capacitor 38 will recharge past the 9V present at terminal 2 causing tile output of comparator section 26a to become low thereby enabling the alarm module 16. On the other hand, if the operator enters the vehicle and either starts the engine or just occupies the vehicle, the comparator section 26b and/or 26c will prevent the system from becoming armed as will now be described.

Terminal 4 of comparator section 26b is given a reference of about 9V by the voltage divider consisting of resistors 52 and 54. When the output of comparator section 26a is low, i.e., the system is armed, the voltage at terminal 4 of comparator section 26b is pulled down to about 3V through resistor 56. On the other hand, terminal 5 of comparator section 26b is held at battery voltage by resistor 58 which connects via bus 34 to the positive side of the battery B. As long as the voltage at terminal 4 is less than the voltage at terminal 5 of comparator section 26b, the voltage at the output of that section at terminal 6 remains high so that section 26b does not function to disarm the system, i.e., the output of comparator 26a remains low. When motion detector 15 does detect motion in the vehicle, its output goes low (essentially 0V). Resultantly, terminal 5 of comparator section 26b is pulled down to about 6V through resistor 62. However, the low output from detector 15 will not set off the alarm module 16 if that module is disabled by a high output voltage from comparator 26a that results from a low input voltage to that comparator's input terminal from comparator section 26b. There are four possible combinations of voltages at the input terminals 4 and 5 of comparator section 26b, only one of which produces a disarming or disabling low output voltage at the output terminal 6 of section 26b. These combinations are as follows:

| 4 | 5 | 6 |
|---|---|---|
| 9 V | 12 V | |
| 9 V | 6 V | low output |
| 3 V | 12 V | |
| 3 V | 6 V | |

As shown by the above chart, when the system is armed so that the voltage at terminal 4 of section 26b is at 3V, the output terminal 6 of comparator section 26b cannot have an output which means that the output of the motion detector 15 cannot disarm the system. However, that output will function to trigger the alarm module 16 signaling that an intruder has entered the vehicle.

On the other hand, when the system is disarmed, i.e., the voltage at the output terminal 3 of comparator section 26a is high, terminal 4 of comparator section 26b is maintained at 9V. When the output of motion detector 15 goes low in response to motion detection, terminal 5 of comparator section 26b goes to about 6V. This causes the voltage at the output terminal 6 to go to ground which prevents the capacitor 38 from charging, thereby preventing the system from becoming armed. When motion detector 15 no longer senses motion in the vehicle, terminal 5 of comparator section 26b goes to 12V and the output terminal 6 floats. This allows capacitor 38 to charge until the voltage at terminal 1 of comparator section 26a exceeds that at terminal 2 whereupon the voltage at the output of that section 26a goes low and enables alarm module 16.

Thus, to summarize the operation of the comparator section 26b, when the system is disarmed, section 26b will respond to the output from the motion detector 15 to prevent the arming of the system. On the other hand, when the system is armed, the detector 15 will cause the alarm module 16 to sound an alarm if it detects a person trying to enter the vehicle.

The comparator section 26c compares the voltage from the vehicle's battery B with a fixed reference to determine when the engine is running. For this, the terminal 8 of section 26b is maintained at about 12.1V by means of the parallel circuit consisting of resistor 68 and the Zener diode 72 which is rated at 12.1V. The input terminal 7 of comparator section 26c is at the center of the voltage divider 64, 66 which maintains the voltage at that terminal at about 91% of the battery voltage. When the vehicle's engine is not running, the battery is at the customary 12.6V so that the voltage at terminal 7 is about 11.4V which is less than the voltage at terminal 8. Therefore, the voltage at the output terminal 9 of comparator section 26c floats which allows the system to become armed.

On the other hand, when the vehicle's engine is running, the battery voltage increases to about 14.4V so that the voltage at terminal 7 of comparator section 26c increases to about 13.1V which is higher than the voltage at terminal 8. At that point, the voltage at the output of comparator section 26c goes low, i.e., to near electrical ground, thereby preventing the capacitor 38 from charging which, in turn, prevents the system from becoming armed.

In summary, then, the comparator section 26c prevents the system from becoming armed and enabling the alarm module 16 when the engine is running; when the engine is not running, the system can be armed and the alarm module 16 enabled if the above conditions shown in the table respecting the voltage at the input terminals 4 and 5 of comparator section 26b are satisfied.

The fourth comparator section 26d uses the motion detector 15 to prevent the power door lock module 17 from becoming operative when there are moving occupants in the vehicle. For this, terminal 11 of section 26d is provided with a fixed voltage of about 5V via the voltage divider 82, 84. Terminal 10 of that same comparator section receives the output from comparator section 26a which, as noted above, is controlled by the motion detector 15. When the motion detector senses that the vehicle has an occupant, terminal 10 will stay at about 9V which is higher than the 5V at terminal 11. Therefore, the output terminal 12 will go to ground, thereby disabling the door lock module 17. On the other hand, when detector 12 no longer senses motion in the vehicle, the voltage at the output terminal 3 of comparator section 26a and, therefore, the voltage at terminal 10 will go to ground so that the voltage at the output terminal 12 of comparator section 26d will go high, being driven by module 17, and the vehicle's doors will lock.

The various electrical components of the system may have the following values:

| | |
|---|---|
| Resistor 32 = 510K | Resistor 64 = 100K |
| Resistor 44 = 150K | Resistor 66 = 1M |
| Resistor 46 = 390K | Resistor 68 = 100K |
| Resistor 52 = 510K | Resistor 82 = 1M |
| Resistor 54 = 1.5M | Resistor 84 = 680K |
| Resistor 56 = 190K | Diode 36 = 1n4001 |
| Resistor 58 - 1M | Capacitor 38 = 33 µf |
| Resistor 62 = 1M | Diode 72 = Zener (12.1) |

A suitable motion detector 15 is available from Directed Electronics. Inc. under the model designation 508 T Field Disturbance Detector; a suitable alarm module 16 may be obtained from Z-Loc Industries, Inc., Norwell, Mass. under the designation M-2, and an appropriate door lock module 17 may be obtained from said Z-Loc Industries, under the designation PDL module.

Figure 2:
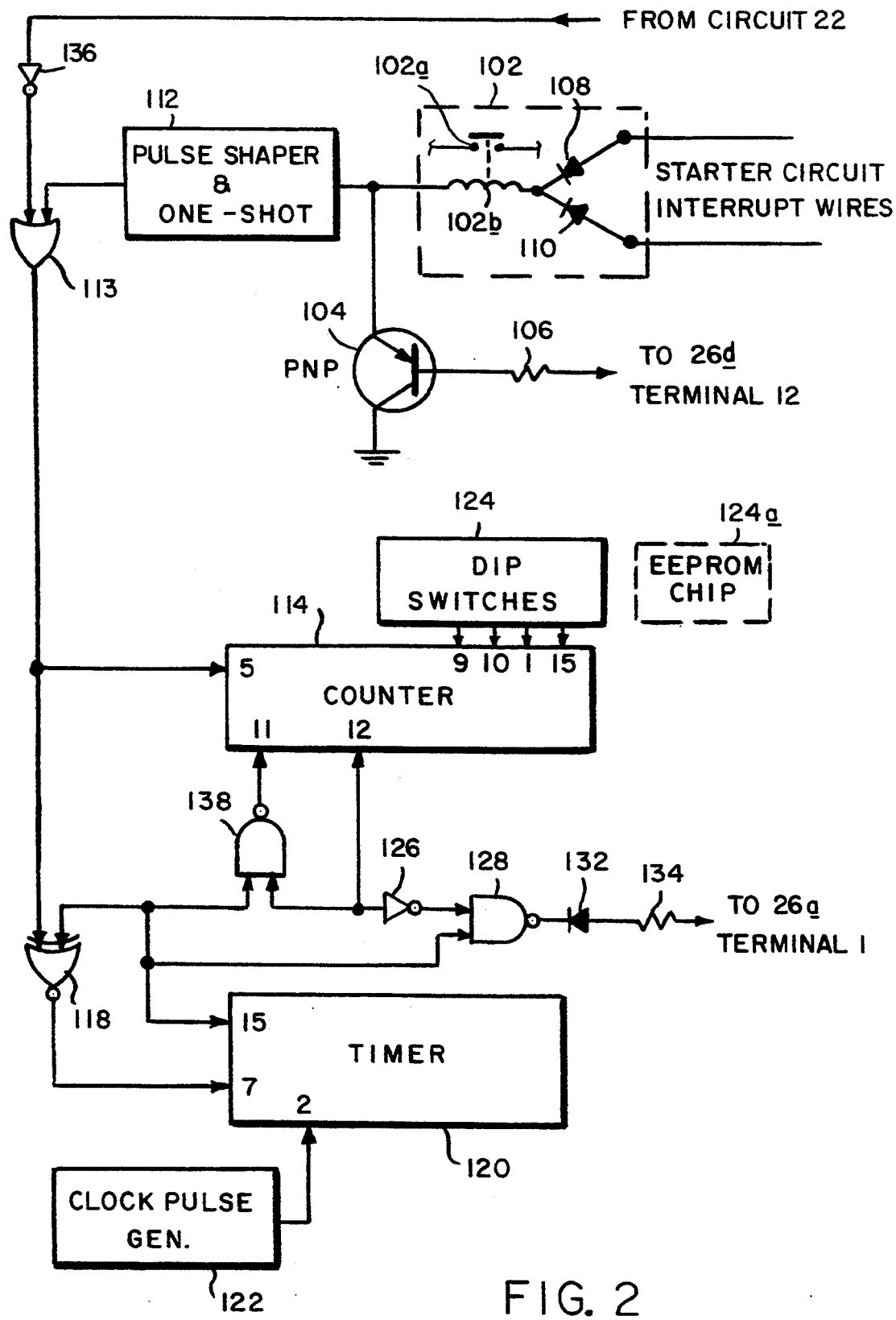
FIG. 2 is a similar view of a secure emergency override circuit add-on to the FIG. 1 system.

Refer now to FIG. 2 which illustrates circuitry for permitting the vehicle operator to de-activate the FIG. 1 security system without the transmitter 18. i.e., without the ability to produce a disarming signal $S_d$. While this emergency override feature is being described with reference to the specific security system depicted in FIG. 1, the same principles may be applied to allow the override, without a hand held transmitter, of any security system that produces or has available a signal when the system is armed and an attempt is made to do something by operating a switch, e.g., turning on lights in a room.

Basically, the FIG. 2 circuit allows one to use the automobile ignition switch to input an override code which will disarm the security system. Thus, this circuit completely eliminates the need for a separate override or valet switch and associated wiring conventionally used for this purpose and the disadvantages associated therewith discussed at the outset.

The FIG. 2 override circuit is basically a TTL digital circuit with three connections to the FIG. 1 circuit and an interrupt connection to the vehicle's starter circuit. One of these leads is connected to the START position terminal to the vehicles ignition switch and the other lead goes to the starter solenoid. The circuit includes a normally open relay 102 which has contacts 102a which, when open, prevent the vehicle starter or ignition system from operating when the vehicle security system is armed. When the system is disarmed, a PNP transistor 104 connected to the coil 102b of relay 102 is biased to terminal 12 of comparator section 26d (FIG. 1) through a resistor 106. When the system is disarmed and the operator turns the vehicle's ignition switch to START, a voltage is present at one of the relay contacts 102a and current passes through either a diode 105 or a diode 110, through the relay coil 102b, and is grounded by transistor 104. The relay coil 102b thereupon becomes excited and the relay contacts 102a close providing a connection which allows the vehicle to start.

Relay 102 has two diodes 105, 110 associated with it to provide a non-polarized installation to the vehicle's starter circuit. That is, the installer does not have to know which end of the starter wire he is interrupting is the hot side.

When the system is armed, transistor 104 is not biased, the relay coil 102b is not grounded and the relay contacts 102a remains open. If a start attempt is made, i.e., the vehicle's ignition switch is turned to START, a voltage is available at both ends of the relay coil 102b. The start attempt pulse is shaped and its duration controlled by a block circuit 112, which may be a standard pulse shaper and one-shot. These pulses from circuit 112 are applied by way of an OR gate 113, to a counter 114 to decrement the counter.

The pulses from gate 113 are also coupled, via on exclusive NOR gate 118, to a timer 120. Counter 114 continues to count pulses, representing start attempts, from circuit 112 while timer 120 is timing out counting pulses from a clock pulse generator 122.

Counter 114 stops at binary 1111 (15) every time because its terminal 15 goes high when that number is reached. Terminal 15 of timer 120, on the other hand, is connected to gate 118 which outputs a low signal to terminal 7 of timer 120 that disables the timer from counting clock pulses from generator 122.

When the system is first powered up, counter 114 counts to binary 1111 and then stops. The circuit then causes the binary code set by four DIP switches 124 to be entered into the counter.

As noted previously, counter 114 simply counts pulses caused by vehicle start attempts. The counter will cycle from 0000 to 0000 (16 pulses) if left unchecked. Binary 0000 is always the required number to disarm the system. The number set into the counter by the DIP switches 124 i.e., the override code, is the starting number for the count down to 0000.

When controlled to do so, a low at counter terminal 11 loads the binary number from DIP switches 124 into the counter. If the override code is set to 1101 (i.e., 13), for example, the vehicle operator must try to start the vehicle three times (i.e., 16-13=3). The count in counter 114 is reset each time the operator makes the wrong number of start attempts by the timing out of timer 120.

If the operator turns the ignition key to START the correct number of times, terminal 12 of counter 114 will go low. This signal is applied by way of an inverter 126 to a NAND gate 128. Gate 128 outputs a low signal which draws current through a diode and a resistor connected in series with terminal 1 of comparator section 26a (FIG. 1). This lowers the voltage across capacitor 38 causing comparator section 26a to send a disarm signal to the alarm module 16 thereby de-activating that module as described above in connection with FIG. 1.

The low signal from gate 128 also causes the output of comparator section 26d (FIG. 1 ) to go low which biases the transistor 104 of the FIG. 2 circuit so that it conducts to ground. This grounding closes the relay 102 as described above allowing the vehicle to start and also stops the pulses from the block circuit 112.

Absent any action by the vehicle operator, gate 128 will remain low and prevent passive arming of the security system, i.e., the system will stay in an override status.

To remove the override status, a correctly coded transmission by circuit 22 must be applied by way of an inverter 136 to OR gate 113. As noted previously, the signal from gate 113 starts timer 120 as well as counter 114. When the timer times out counting pulses from generator 122, its terminal 15 goes high. This terminal is connected to the input of a NAND gate 138 whose output is coupled to terminal 11 of counter 114. Gate 138 outputs a low signal to the counter which loads the pre-selected starting count set by switches 124 into the counter. Since the counter now does not have the correct finish count, gate 128 cannot actively hold the system in a disarmed condition. Consequently, the system reverts to its normal passive mode, but it is still disarmed.

If the vehicle operator enters the wrong override code (i.e., number of start attempts), terminal 12 of counter 114 will still have a high output. Thus, when timer 120 times out, its terminal 15 will go high. This high signal and the high from terminal 12 of counter 114 are applied to gate 138 which thereupon inputs a low signal to terminal 11 of the counter which loads the pre-selected starting number (i.e., override code) set by DIP switches 124 into the counter as noted previously. Thus, the system will not disarm.

For example, if the disarm code is four attempted start pulses and timer 120 is set at thirty seconds, the vehicle operator would have to wait about twenty seconds after the code is entered before the system disarms. Thus, even if a thief knew the code, he might not wait the correct time before again trying to start the vehicle. If he tries to start the vehicle before waiting the full 20 seconds, the next start attempt will actually change the code that he entered.

Figure 3A:
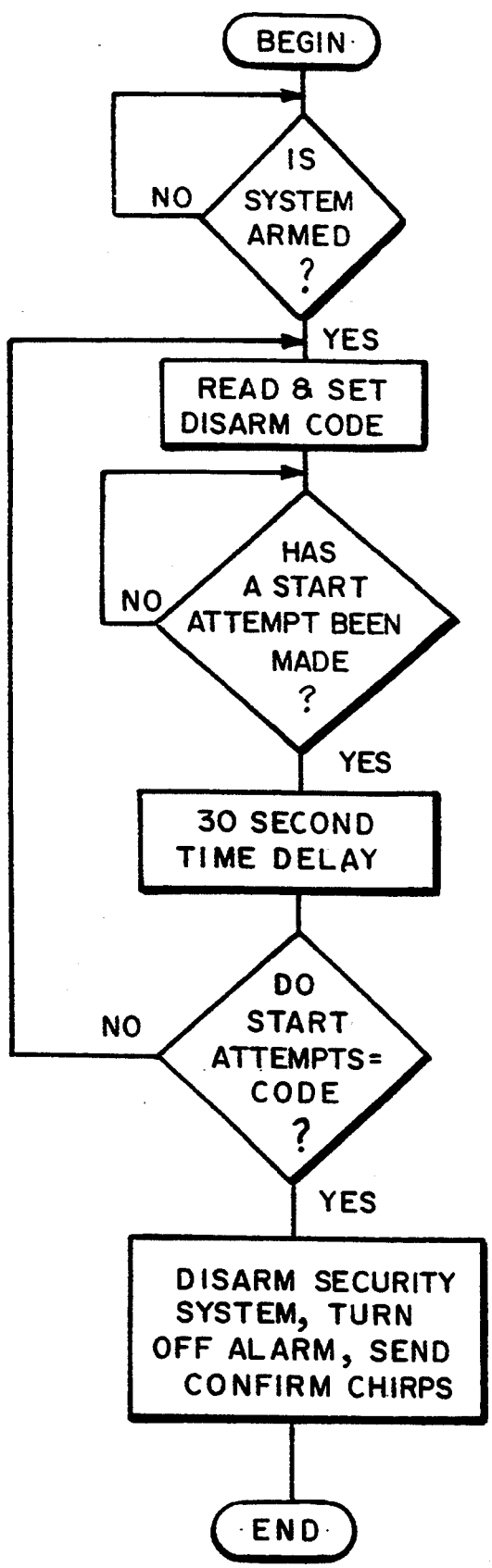
FIGS. 3A and 3B are flow charts which explain the operation of the FIG. 2 emergency override circuit.

FIG. 3A describes the logical operation of the FIG. 2 circuit.

Figure 3B:
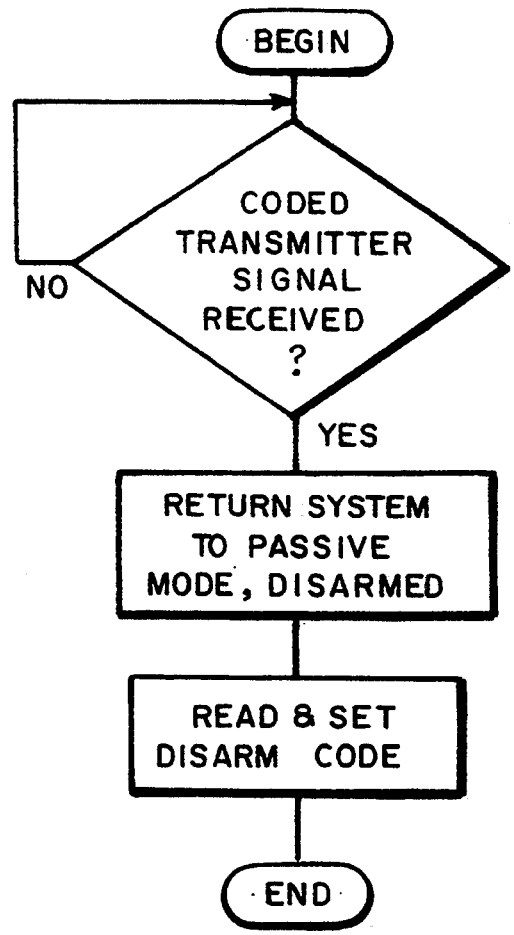

If the operator has a working transmitter 18 (FIG. 1) and wants to place the system in the emergency override or valet mode, he may do so by directly transmitting the correct override code pulses to the FIG. 2 override circuit using the transmitter. The FIG. 3B flow chart describes the operation of the FIG. 2 circuit in this mode.

The designations of the various components in the FIG. 2 circuit are as follows:

Resistor 106=1.8K
Resistor 134=1.8K
Diode 108=1N4001
Diode 110=1N4001
Diode 132=1N4001
Counter 114=74193
Timer 120=74161

FIGS. 2 and 3A, B illustrate a security system whose emergency override code includes a selected time delay after the disarm code has been put in using the vehicle's starting switch. It is also possible to arrange the system with a delay or delays during the putting in of that code.

The override code (i.e., start attempts plus time delays) may be coded into an EEPROM chip by the system's arm/disarm transmitter 18 (FIG. 1). In this case, an EEPROM chip 124a is substituted for the DIP switches 124 as shown in phantom in FIG. 2.

Virtually all vehicle security systems can operate in a panic mode which is enabled when a panic button 18a on the transmitter 18 is depressed for a short time, e.g., three seconds. In the panic mode, the system's processor sounds the alarm for, say, sixty seconds. This same button may be used to enter a learning mode in order to program the override code into the system.

Figure 4:
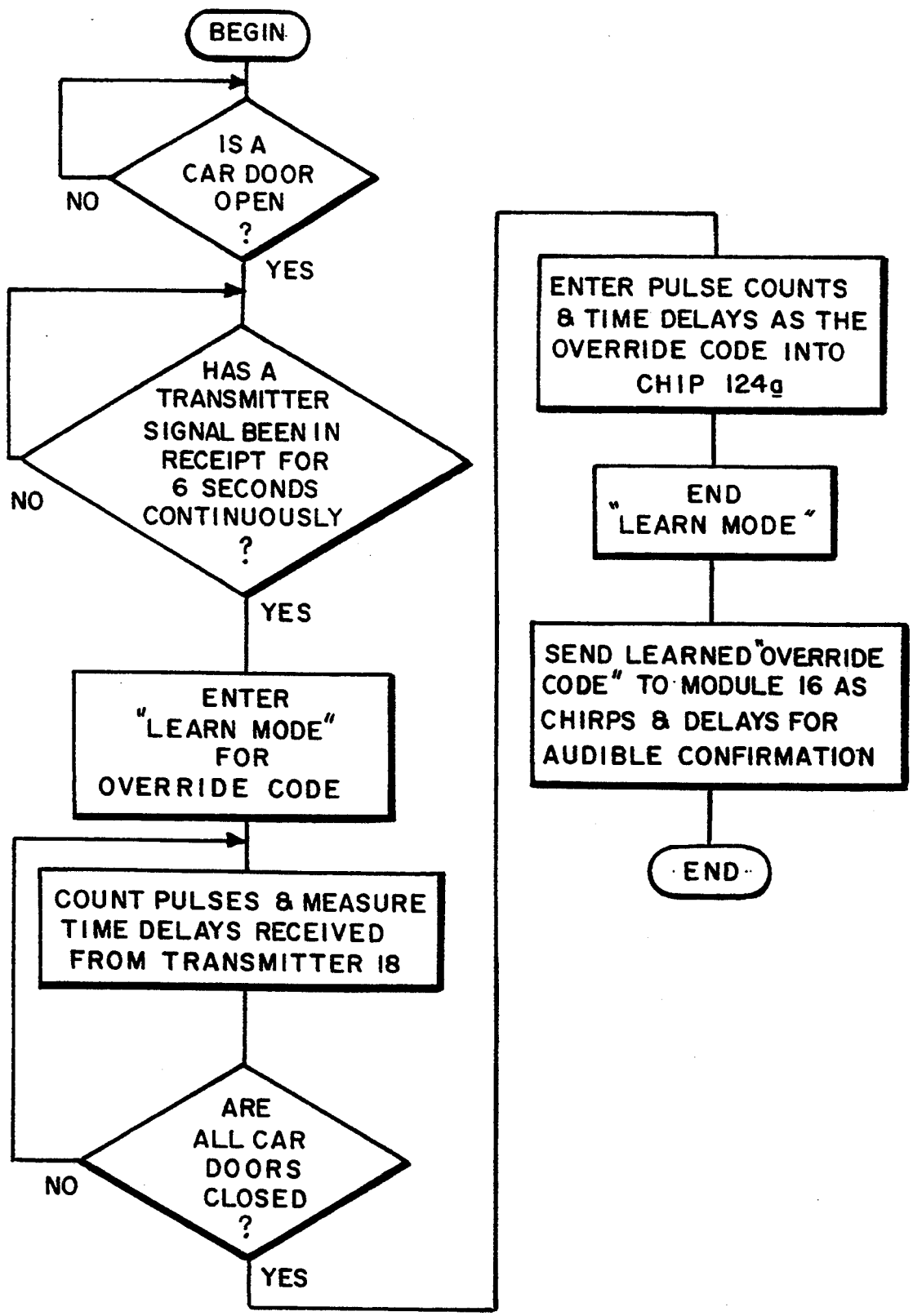
FIG. 4 is a similar chart explaining the operation of another system embodiment.

The flow chart depicted in FIG. 4 shows one method of programming an override code when the system is in the learn mode.

First, a vehicle door may be left open. Then, the transmitter panic button 18a may be held down for the requisite time, i.e., six seconds. The panic mode will start after three seconds and stop at six seconds. When the system's alarm stops sounding, the "before" code time has started. Button 18a is also used to teach chip 124a the secret sequence of start attempts and delays before or between start attempts. For example, if "P" represents a start attempt (current pulse) and "-" represents a one second delay, a suitable code might be: --PP-P.

After the code is set in using button 18a, the open door may be closed, completing the learning sequence. If desired, the alarm module may "chirp" the new code (including delays) back to the operator to confirm that the code has been set. At any time, the audible confirmation may be repeated by entering the learning mode and then closing the door without pressing button 18a after the alarm stops.

In an actual use of the code to disarm the system in an emergency, the "before" time delay starts when the door is closed after one enters the vehicle. Pulse coding, with time delays mixed in, may be visualized as a secret knock to gain entrance to the vehicle.

One may also choose to replace the door open signal to the system's processor that initiates the learning mode with another available input or condition such as parking lights on, or trunk open.

It will be seen from the foregoing that my improved passive security system delays or prevents the arming or activation of the system at inopportune times such as when the space being protected is already occupied by people or pets and, in the case of a motor vehicle, when the vehicle's engine is running. My invention also prevents the system from becoming armed prematurely and locking the doors into the space to be protected when that space is still occupied. Thus, the system reduces the incidence of false alarms and lessens the chances of someone already present in a secured space being unable to exit that space in the event of an emergency. Finally, the system includes an emergency override capability so that the vehicle operator or other authorized person having the correct disarming code (i.e., start attempt number plus delay(s)) can disarm the security system without having to use the transmitter. Moreover, the override function does not require any hidden switch or the like as do most present day security systems with this capability.

While providing the aforesaid advantages, my improved security system does not cost appreciably more than comparable systems on the market because the aforesaid advantages can be obtained using, for the most part, the very same detection devices used to trigger the alarms of conventional security systems.

It will thus be seen that the objects set forth above, among those made apparent from the preceding description, are efficiently attained. Also, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention described herein.

I claim:

1. A security system for a vehicle having an engine with an ignition switch movable between an engine START position wherein said switch carries a current pulse and an OFF position, said system comprising
   vehicle securing means;
   actuator means for actuating the vehicle securing means;
   deactivating means responsive to a selected number of attempts to start the engine for deactivating the vehicle securing means, and
   means for disabling the deactivating means after a number of attempts to start the engine other than the selected number have been made a plurality of times.

2. A security system for a vehicle having an engine with an ignition switch movable between an engine START position wherein said switch carries a current pulse and an OFF position, said system comprising
   vehicle securing means;
   actuating means for actuating the vehicle securing means, and
   deactivating means responsive to a selected number of attempts to start the engine for deactivating the vehicle securing means, said deactivating means including a counter for counting the number of current pulses caused by movements of said switch to the START position, said counter producing an output signal which deactivates the vehicle securing means when the counter has counted to the selected number of pulses.

3. The system defined in claim 2 wherein the vehicle securing means includes means for preventing engine operation.

4. The system defined in claim 2 wherein
   the vehicle securing means include settable alarm means for producing, when set by an arming signal, an alarm indication in response to a trigger signal, an arming circuit which, when actuated, produces an arming signal to set said alarm means, and intrusion detection means for detecting an intrusion into the vehicle and providing a trigger signal to said alarm means in response thereto;

said actuating means actuates said arming circuit, and said deactivating means deactivates said arming circuit.

5. The system defined in claim 4 wherein said vehicle securing means also include means for preventing engine operation when said alarm means are set.

6. The vehicle security system defined in claim 2 wherein the deactivating means also include delay means for delaying the deactivation of said vehicle securing means for a selected period of time before, during or after the selected number of pulses have been detected.

7. The system defined in claim 2 wherein the deactivating means also include
- a timer;
- means for applying one of said current pulses to start the timer, said timer thereupon emitting an output signal after a selected period of time. and
- means for detecting the presence simultaneously of said output signals from said counter and said timer and producing a deactivating signal which deactivates the vehicle securing means.

* * * * *